United States Patent
Ventuleth et al.

(10) Patent No.: US 12,030,977 B2
(45) Date of Patent: Jul. 9, 2024

(54) METHODS FOR PREPARING PHTHALONITRILE COATING COMPOSITIONS

(71) Applicant: The Boeing Company, Chicago, IL (US)

(72) Inventors: Michael Ventuleth, Camarillo, CA (US); Ashley M. Dustin, Santa Monica, CA (US)

(73) Assignee: The Boeing Company, Chicago, IL (US)

( * ) Notice: Subject to any disclaimer, the term of this patent is extended or adjusted under 35 U.S.C. 154(b) by 263 days.

(21) Appl. No.: 17/572,750

(22) Filed: Jan. 11, 2022

(65) Prior Publication Data

US 2022/0227912 A1    Jul. 21, 2022

Related U.S. Application Data (60) Provisional application No. 63/139,327, filed on Jan. 20, 2021.

(51) Int. Cl.
   *C08G 16/06*   (2006.01)
   *B05D 1/12*   (2006.01)
   (Continued)

(52) U.S. Cl.
   CPC ............. *C08G 16/06* (2013.01); *B05D 1/12* (2013.01); *C08J 5/244* (2021.05); *C09D 5/021* (2013.01);
   (Continued)

(58) Field of Classification Search
   CPC ....... C08G 16/06; C08J 5/244; C08J 2361/00; B05D 1/12; C09D 5/021; C09D 161/00
   (Continued)

(56) References Cited

U.S. PATENT DOCUMENTS

| | | | |
|---|---|---|---|
| 5,242,755 | A | 9/1993 | Keller et al. |
| 5,965,268 | A | 10/1999 | Sastri et al. |

(Continued)

FOREIGN PATENT DOCUMENTS

| | | | |
|---|---|---|---|
| CN | 106632274 | 5/2017 | |
| CN | 107903189 A | * 4/2018 | ........... C07C 255/16 |

(Continued)

OTHER PUBLICATIONS

Wang et al., CN 109705072 A machine translation in English, May 3, 2019. (Year: 2019).*

(Continued)

*Primary Examiner* — David T Karst
(74) *Attorney, Agent, or Firm* — Bell & Manning, LLC (57) ABSTRACT

Methods of preparing phthalonitrile coating compositions are provided, including phthalonitrile sprays, phthalonitrile pastes, and phthalonitrile composite films. In embodiments, such a method comprises, heating a phthalonitrile precursor composition comprising a bisphthalonitrile compound to a temperature and for a period of time to form a phthalonitrile prepolymer composition comprising a bisphthalonitrile prepolymer; cooling the phthalonitrile prepolymer composition to ambient temperature and pulverizing the phthalonitrile prepolymer composition to form particles; combining the particles with a liquid medium to form a phthalonitrile solution; optionally, adding an additive to the phthalonitrile solution; and mixing the phthalonitrile solution to form a phthalonitrile coating composition.

22 Claims, 2 Drawing Sheets

(51) Int. Cl.
*C08J 5/24* (2006.01)
*C09D 5/02* (2006.01)
*C09D 161/00* (2006.01)

(52) U.S. Cl.
CPC ......... *C09D 161/00* (2013.01); *C08J 2361/00* (2013.01)

(58) Field of Classification Search
USPC ........................................................ 523/222
See application file for complete search history.

(56) References Cited

U.S. PATENT DOCUMENTS

| | | | |
|---|---|---|---|
| 6,001,926 A | 12/1999 | Sastri et al. | |
| 8,222,403 B2 | 7/2012 | Laskoski et al. | |
| 8,921,510 B1 | 12/2014 | Keller et al. | |
| 11,746,262 B2 | 9/2023 | Dustin et al. | |
| 2005/0054886 A1* | 3/2005 | Jones | C07C 209/48 568/812 |
| 2006/0194944 A1 | 8/2006 | Fowler et al. | |
| 2017/0002146 A1 | 1/2017 | Keller et al. | |
| 2017/0217873 A1* | 8/2017 | Ibi | B01D 3/14 |
| 2018/0313405 A1* | 11/2018 | Richard | F16C 17/10 |

FOREIGN PATENT DOCUMENTS

| | | | | |
|---|---|---|---|---|
| CN | 108799335 A | * | 11/2018 | ............ C08J 5/04 |
| CN | 109705072 A | * | 5/2019 | ......... C07D 307/90 |
| WO | WO 2014/021946 A | | 2/2014 | |
| WO | WO 2016/100259 A | | 6/2016 | |
| WO | WO 2018/175025 A | | 9/2018 | |

OTHER PUBLICATIONS

Nolan et al., CN 108799335 A machine translation in English, Nov. 13, 2018. (Year: 2018).*
Wang et al., CN 107903189 A machine translation in English, Apr. 13, 2018. (Year: 2018).*
Sheng et al., "Synthesis of high performance bisphthalonitrile resins cured with self-catalyzed 4-aminophenoxy phthalonitrile," Thermochimica Acta 577 (2014) 17-24.
Patel et al., "Mechanism of thermal decomposition of poly(ether ether ketone) (PEEK) from a review of decomposition studies," Polymer Degradation and Stability 95, pp. 709-718, May 2010.
Dominguez et al., "The Effect of Curing Additive on the Mechanical Properties of Phthalonitrile-Carbon Fiber Composites," *Polymer Composites*, Oct. 2004, vol. 25, No. 5.
Extended Search Report issued on EP21201668.7, dated Mar. 14, 2022.
Laskoski, Matthew, Arica R. Shepherd, Wadia Mahzabeen, Jadah S. Clarke, Teddy M. Keller, and Usman Sorathia. 1 "Sustainable, fire-resistant phthalonitrile-based glass fiber composites." Journal of Polymer Science Part A: Polymer Chemistry 56, No. 11 (Mar. 12, 2018): 1128-1132.

* cited by examiner

METHODS FOR PREPARING PHTHALONITRILE COATING COMPOSITIONS

CROSS REFERENCE TO RELATED APPLICATIONS

The present application claims the benefit of and priority under 35 U.S.C. § 119(e) to U.S. Provisional Patent Application No. 63/139,327 that was filed Jan. 20, 2021, the entire contents of which are incorporated by reference.

BACKGROUND

Commercial and military aircraft increasingly require extreme thermal robustness in flexible elastomer materials and adhesives in both manufacturing and inflight applications. Current high temperature aerospace elastomers are dominated by traditional siloxane formulations, such as Momentive RTV-60 and Nusil 2145, stabilized with iron oxide ($Fe_2O_3$) particles. However, these formulations are susceptible to a decrease in mechanical properties due to network degradation and oxidation over time in many high temperature (>550° F.) aerospace applications including adhesive bonding, thermal protection systems, and high temperature tooling. An alternative class of products is based on a class of high temperature polymers/adhesives known as phthalonitriles (PNs). PNs can exhibit exceptionally high thermooxidative stability. Unfortunately, they have been plagued by processing challenges, inhibiting their application to vertical surfaces, overhead surfaces, and other hard to reach areas on substrates. Polyether ether ketone (PEEK) based PN resins have been synthesized in order to incorporate flexibility and solubility into an otherwise intractable material. However, the same processing challenges remain.

SUMMARY

Provided herein are methods for preparing phthalonitrile coating compositions, including embodiments which address the processing challenges described above. The coating compositions may be in the form of pastes, sprays, or composite films, formulations which may be readily applied to a variety of substrates. Embodiments of these formulations can be stored for extended periods of time (e.g., >3 weeks) and still be cured to form high quality, void free thermosets.

A first embodiment is a method for preparing a phthalonitrile coating composition is provided, the method comprising (a) heating a phthalonitrile precursor composition comprising a bisphthalonitrile compound to a temperature and for a period of time to form a phthalonitrile prepolymer composition comprising a bisphthalonitrile prepolymer; (b) cooling the phthalonitrile prepolymer composition to ambient temperature and pulverizing the phthalonitrile prepolymer composition to form particles; (c) combining the particles with a liquid medium to form a phthalonitrile solution; (d) optionally, adding an additive to the phthalonitrile solution; and (e) mixing the phthalonitrile solution to form a phthalonitrile coating composition.

An embodiment 2 is a method according to embodiment 1, wherein the bisphthalonitrile compound comprises an aromatic ether linking group and an aromatic ketone linking group.

An embodiment 3 is a method according to embodiment 2, wherein the aromatic ether linking group is provided by a bisphenol and the aromatic ketone linking group is provided by a benzophenone.

An embodiment 4 is a method according to any of embodiments 1-3, wherein the phthalonitrile precursor composition further comprises a curing agent, a phthalonitrile additive, or both.

An embodiment 5 is a method according to any of embodiments 1-4, wherein the phthalonitrile precursor composition and the phthalonitrile coating composition is free of a phthalonitrile additive.

An embodiment 6 is a method according to any of embodiments 1-5, wherein the temperature is not more than 250° C. and the period of time is not more than 120 minutes in step (a).

An embodiment 7 is a method according to any of embodiments 1-6, wherein the bisphthalonitrile prepolymer has a solubility in the liquid medium in a range of from 0.1 g/mL to 5 g/mL at ambient temperature and atmospheric pressure.

An embodiment 8 is a method according to any of embodiments 1-7, wherein the liquid medium comprises a solvent having a boiling point of greater than 150° C.

An embodiment 9 is a method according to any of embodiments 1-8, wherein the liquid medium comprises two solvents, each having different boiling points.

An embodiment 10 is a method according to any of embodiments 1-9, wherein the phthalonitrile solution comprises at least 30 weight % of the liquid medium and not more than 70 weight % of the phthalonitrile prepolymer composition.

An embodiment 11 is a method according to any of embodiments 1-10, the method comprising step (d).

An embodiment 12 is a method according to embodiment 11, wherein the additive is selected from a group consisting of a filler, a dispersant, a flow agent, a cure promoter, and a surfactant and the phthalonitrile solution comprises from 0.001 weight % to 20 weight % of the additive.

An embodiment 13 is a method according to embodiment 12, wherein the additive is not a phthalonitrile additive and is not a non-reactive plasticizer and the phthalonitrile coating composition is free of the phthalonitrile additive and the non-reactive plasticizer.

An embodiment 14 is a method according to any of embodiments 1-13, wherein the mixing is carried out at ambient temperature and ambient atmosphere.

An embodiment 15 is a method according to any of embodiments 1-14, wherein the mixing is carried out at a speed in a range of from 1000 rpm to 2300 rpm and for a time in a range of from 10 seconds to 30 minutes.

An embodiment 16 is a method according to any of embodiments 1-15, the method further comprising after mixing the phthalonitrile solution, storing the mixed phthalonitrile solution for a second period of time at ambient temperature to form the phthalonitrile coating composition as a phthalonitrile paste.

An embodiment 17 is a method according to embodiment 16, wherein the period of time is in a range of from 1 day to 14 days.

An embodiment 18 is a method according to any of embodiments 1-15, the method further comprising after mixing the phthalonitrile solution, applying the mixed phthalonitrile solution to a fibrous material comprising a plurality of fibers to infiltrate the mixed phthalonitrile solution into void spaces between fibers of the plurality of fibers;

and removing a portion of the liquid medium to form the phthalonitrile coating composition as a phthalonitrile composite film.

An embodiment 19 is a method according to embodiment 17, wherein the removing is carried out via evaporation at ambient temperature and ambient atmosphere.

An embodiment 20 is a method according to any of embodiments 1-15, wherein the phthalonitrile coating composition is in the form of a spray having a shear viscosity of less than 300 cps as measured at ambient temperature and 100 Hz.

An embodiment 21 is a method according to any of embodiments 1-17, wherein the phthalonitrile coating composition is in the form of a paste having a shear viscosity of greater than 1,000 cps as measured at ambient temperature and 100 Hz.

An embodiment 22 is a method according to any of embodiments 1-21, the method further comprising applying the phthalonitrile coating composition to a surface of a substrate to form a coating thereon.

An embodiment 23 is a method according to embodiment 22, wherein the substrate is an aerospace component.

An embodiment 24 is a method according to embodiment 22, the method further comprising heating the coating according to a curing profile to form a thermoset polymer.

An embodiment 25 is a method according to embodiment 24, wherein the thermoset polymer is characterized by a glass transition temperature $T_g$ in a range of from 200° C. to 500° C., a degradation temperature of greater than 450° C., or both.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

DETAILED DESCRIPTION

Provided herein are methods for preparing phthalonitrile coating compositions. The coating compositions, including phthalonitrile pastes, phthalonitrile sprays, and phthalonitrile composite films are also encompassed.

Definitions

A phthalonitrile moiety refers to a portion of a molecule, compound, and the like, the portion having the following structure:

The term "crosslink" and the like refers to covalent bonds formed between cyano groups on different phthalonitrile moieties induced by heat and generally, a curing agent.

In embodiments, a method of making a phthalonitrile coating composition comprises heating a phthalonitrile precursor composition comprising a bisphthalonitrile compound to a temperature and for a period of time to form a phthalonitrile prepolymer composition comprising a bisphthalonitrile prepolymer. The phthalonitrile prepolymer composition is cooled to ambient temperature and pulverized to form particles. The particles are combined with a liquid medium to form a phthalonitrile solution. If desired, one or more additives may be added to the phthalonitrile solution. The phthalonitrile solution is mixed to form the phthalonitrile coating composition. In embodiments, the mixed phthalonitrile composition is stored for a period of time to form the phthalonitrile coating composition. In embodiments, a portion of the liquid medium is removed from the mixed phthalonitrile composition to form the phthalonitrile coating composition. By "a portion" it is meant less than all so that at least some liquid medium remains in the formed phthalonitrile coating composition. As further described below, these steps may be further leveraged to achieve various types of phthalonitrile pastes, phthalonitrile sprays, and phthalonitrile composite films.

The phthalonitrile precursor composition comprises a bisphthalonitrile compound. A variety of types of bisphthalonitrile compounds may be used, including combinations of different types of bisphthalonitrile compounds. The bisphthalonitrile compound comprises two terminal phthalonitrile moieties which are connected via one or more linking groups such as an aromatic ether, a thioether, an imide, a sulfone, a heterocyclic ether, an aromatic ketone, a urethane, a urea, an amide, an ester, an oxamide, and combinations thereof. Such bisphthalonitrile compounds are commercially available or may be formed using known synthetic methods. The synthetic methods used to provide such bisphthalonitrile compounds generally result in different numbers of the linking group(s) being incorporated into the bisphthalonitrile compounds between the two terminal phthalonitrile moieties and a corresponding distribution of molecular weights. Thus, in the present disclosure, the phrase "bisphthalonitrile compound" may be referred to as an "oligomer" and the like. Similarly, the phrase encompasses each of the bisphthalonitrile compounds formed by such a synthetic method, each of which may have a different number of the linking group(s) and a different molecular weight. Thus, the bisphthalonitrile precursor composition may comprise each of these bisphthalonitrile compounds. The phrase "bisphthalonitrile compound" also encompasses a small molecule, a molecule which is distinguished from an oligomer by having no more than one linking group between the two terminal phthalonitrile moieties. Illustrative bisphthalonitrile compounds include those described in U.S. Pat. No. 8,222,403; U.S. Pat. Pub. No. 20170002146; International Pat. Pub. No. 2014021946; and International Pat. Pub. No. 2018175025; the disclosures of each of which are incorporated by reference for purposes of the bisphthalonitrile compounds.

Figure 1:
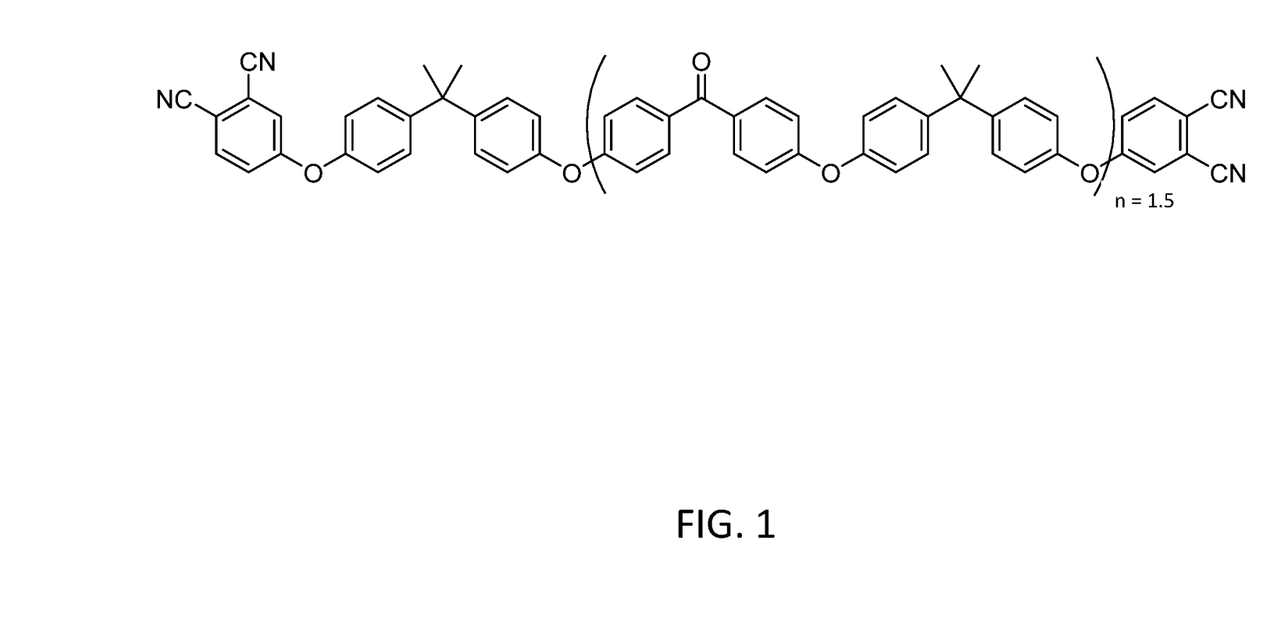
FIG. 1 shows a structure of an illustrative bisphthalonitrile compound.

In embodiments, the bisphthalonitrile compound comprises at least one aromatic ether linking group and at least one aromatic ketone linking group between the two terminal phthalonitrile moieties. Such bisphthalonitrile compounds may be formed using known synthetic methods, e.g., involving the reaction of a dihydroxyaromatic with a dihaloaromatic such as dihalobenzophenone, followed by endcapping with 4-nitrophthalonitrile. An illustrative such bisphthalonitrile compound is shown in FIG. 1, formed using bisphenol A as the dihydroxyaromatic and dichlorobenzophenone as the dihaloaromatic. As shown, the average value of n is 1.5. Such a bisphthalonitrile compound may be obtained commercially, e.g., Bis A Oligomeric Phthalonitrile Composition from the Naval Research Laboratory. However, other similar bisphthalonitrile compounds may be used, e.g., those based on other dihydroxyaromatics, including other bisphenols. Illustrative dihydroxyaromatics include bisphenol AF, resorcinol, 2,2-bis(4-hydroxyphenyl)propane, 2,2-bis(4-hydroxyphenyl)-1,1,1,3,3,3-hexafluoropropane, and the like.

Although not necessary, the phthalonitrile precursor composition may comprise a curing agent. A variety of types of curing agents may be used, provided the curing agent is capable of inducing crosslinking reactions between phthalonitrile moieties, i.e. reactions between cyano groups on phthalonitrile moieties to form covalent crosslinks. These covalent crosslinks may include polytriazine-type, polyindoline-type, phthalocyanine-type crosslinks, and combinations thereof. Combinations of different types of curing agents may be used. If a curing agent is not included, the crosslinking reactions will still occur, albeit at a slower rate.

Illustrative curing agents include amines, diamines, phenolics, acids, metals, metal salts, and combinations thereof. Regarding diamines, illustrative curing agents include 4,4'-(1,3-phenylenedioxy)dianiline; 4,4'-(1,4-phenylenedioxy)dianiline; bis[4-(4-aminophenoxy)phenyl]sulfone; 4,4'-(4,4'-isopropylidenediphenyl-1,1'-diyldioxy)dianiline; 4,4'-(1,3-phenylenediisopropylidene)dianiline; 4,4'-(1,4-phenylenediisopropylidene)dianiline; 4,4'-(1,1'-biphenyl-4,4'-diyldioxy)dianiline, 4,4'-methylenedianiline; 4,4'-sulphonyldianiline; 4,4'-methylene-bis(2-methylaniline); 3,3'-methylenedianiline; 3,4'-methylenedianiline; 4,4'-oxydianiline; 4,4'-(isopropylidene)dianiline; 4,4'-(hexafluoroisopropylidene)dianiline; 4,4'-(hexafluoroisopropylidene)bis(p-phenyleneoxy)dianiline; 4,4'-diaminobenzophenone; and melamine. Regarding phenolics, hydroxyquinone is an illustrative curing agent. Regarding metals and metal salts, illustrative curing agents include copper acetylacetonate, palladium acetylacetonate, cobalt acetylacetonate, nickel acetylacetonate, and iron acetylacetonate. Other illustrative curing agents include those described in U.S. Pat. Nos. 4,408,035; 4,410,676; 5,247,060; 8,735,532; 8,921,510; and International Pat. Pub. No. 2014021946; the disclosures of each of which are incorporated by reference for purposes of the curing agents.

If a curing agent is included in the phthalonitrile precursor composition, the amount of the curing agent may be in a range of from 1 weight % to 10 weight %, including from 2 weight % to 8 weight %, and from 2 weight % to 5 weight % as compared to the total weight of the phthalonitrile precursor composition. When multiple curing agents are used, these weight percentages refer to the total weight of the multiple curing agents.

The phthalonitrile precursor composition may comprise one or more types of phthalonitrile additives. Phthalonitrile additives are small molecules comprising one or more phthalonitrile moieties (e.g., 2 such moieties). The additives are distinguished from the oligomers, prepolymers, and thermoset polymers described herein. Although the bisphthalonitrile compound of the phthalonitrile precursor composition may also be a small molecule, the bisphthalonitrile compound is a different compound, i.e., a different chemical species, from the phthalonitrile additive. Similarly, curing agents and phthalonitrile additives refer to different compounds. A variety of types of phthalonitrile additives may be used, including combinations of different types of additives. Illustrative phthalonitrile additives include those described in U.S. patent application Ser. No. 16/863,052, PHTHALONITRILE ADHESIVE FORMULATIONS AND RELATED METHODS, filed Apr. 30, 2020, which is hereby incorporated by reference in its entirety.

If a phthalonitrile additive is included in the phthalonitrile precursor composition, it may be present at an amount in a range of from 2 mol % to 30 mol %, including from 2 mol % to 25 mol %, from 5 mol % to 20 mol %, and from 5 mol % to 15 mol %. The term "mol %" refers to the mole percentage of the phthalonitrile additive as compared to the total moles of the phthalonitrile additive and the bisphthalonitrile compound in the phthalonitrile precursor composition. When multiple phthalonitrile additives and/or bisphthalonitrile compounds are used, these mole percentages refer to the total moles of the multiple phthalonitrile additives and the total moles of the multiple bisphthalonitrile compounds.

In embodiments, however, phthalonitrile additives are not used and the phthalonitrile precursor composition (and the phthalonitrile coating composition) is free of any such phthalonitrile additives. This includes the phthalonitrile pastes, phthalonitrile sprays, and phthalonitrile composite films being free of phthalonitrile additives. Such embodiments exclude the use of phthalonitrile additives comprising ether functional groups or thioether functional groups such as those disclosed in WO2018175025, which is hereby incorporated by reference for purpose of the phthalonitrile additives comprising ether functional groups or thioether functional groups.

Otherwise, the balance of the phthalonitrile precursor composition may be made up of the one or more types of bisphthalonitrile compounds. Thus, the bisphthalonitrile compound(s) may be present in the phthalonitrile precursor composition at an amount of at least 80 weight %, at least 85% weight %, at least 90 weight %, or 100 weight % as compared to the total weight of the phthalonitrile precursor composition.

As noted above, the present methods comprise heating the phthalonitrile precursor composition to a temperature and for a period of time. These conditions induce crosslinking reactions between phthalonitrile moieties to form the phthalonitrile prepolymer composition comprising the bisphthalonitrile prepolymer. However, these conditions generally result in partial curing such that only a portion (less than all) of the phthalonitrile moieties are crosslinked. That is, partial curing converts a portion (less than all) of the bisphthalonitrile compound, and if present, a portion (less than all) of the phthalonitrile additive, to the bisphthalonitrile prepolymer comprising the covalent crosslinks described above. Uncrosslinked bisphthalonitrile compound, and if a phthalonitrile additive and/or curing agent were used, uncrosslinked phthalonitrile additive, and/or unreacted curing agent also remain such that the phthalonitrile prepolymer composition also comprises these components.

Conditions to achieve partial curing are different than those used to convert the phthalonitrile coating composition to a thermoset polymer, and involve lower temperatures and/or shorter times. Thus, the number of covalent crosslinks, i.e., the degree of crosslinking, achieved during partial curing is less than in the thermoset polymer. Although the conditions to achieve partial curing will depend upon the type of phthalonitrile precursor composition selected, illustrative conditions include heating at a temperature of no more than 250° C. for no more than 120 minutes, no more than 225° C. for no more than 105 minutes, or no more than 215° C. for no more than 90 minutes. Conditions further include a temperature in a range of from 175° C. to 250° C. or 190° C. to 210° C. for from 20 minutes to 120 minutes or from 80 minutes to 100 minutes.

The present methods further comprise cooling the phthalonitrile prepolymer composition to ambient temperature. "Ambient temperature" is room temperature, a temperature generally in a range of from 20° C. to 25° C. The cooling may comprise quench cooling. Quench cooling refers to cooling over a short period of time, e.g., within 90 seconds, 60 seconds, or 30 seconds. As noted above, the method further comprises pulverizing the phthalonitrile prepolymer composition to form particles, including a powder. This may be accomplished using a mortar and pestle and may include centrifugal mixing, although other pulverizing techniques may be used.

The present methods further comprise combining the particles with a liquid medium to form the phthalonitrile solution. The liquid medium may comprise one or more solvents, e.g., organic solvents. Although a variety of types of solvents may be used, selection is generally based on the ability of the liquid medium to dissolve the bisphthalonitrile prepolymer of the phthalonitrile prepolymer composition. In embodiments, the bisphthalonitrile prepolymer has a solubility in the liquid medium in a range of from 0.1 g/mL to 5 g/mL at ambient temperature and atmospheric pressure. This includes a range of from 0.5 g/mL to 5 g/mL, and from 1 g/mL to 5 g/mL. The composition of the liquid medium is also guided by the desired form of the phthalonitrile coating composition, i.e., paste, spray, or composite film.

In embodiments, the liquid medium comprises a solvent having a boiling point of greater than 150° C., greater than 200° C., or greater than 250° C. Solvents with relatively high boiling points are well retained under ambient conditions, improving shelf life and stability. In embodiments, the liquid medium comprises two solvents having different boiling points but which are still miscible with one another. The solvent having the lower boiling point facilitates dissolution of the bisphthalonitrile prepolymer, while the solvent having the higher boiling point resists removal under ambient conditions. One of the solvents may having a boiling point of greater than 150° C., greater than 200° C., or greater than 250° C. as described above, while the other solvent may have a lower boiling point. If a portion (less than all) of the liquid medium is eventually removed to form the phthalonitrile coating composition, the solvent having the lower boiling point may be removed via evaporation at ambient temperature.

Illustrative solvents include alcohols and ketones such as acetone, methyl ethyl ketone, methyl propyl ketone, methyl isobutyl ketone, n-butyl acetate, 2-phenoxyethanol, n-methylpyrrolidone. These are examples of polar organic solvents. Other illustrative solvents include nonpolar organic solvents such as toluene, xylene, and benzene.

The amount of liquid medium (as well as the relative amounts of different types of solvents, if more than one type is used) used depends on the desired form of the phthalonitrile coating composition. However, in embodiments, the amount of liquid medium in the phthalonitrile solution is at least 30 weight % as compared to the total weight of the solution. This includes at least 40 weight %, at least 50 weight %, at least 60 weight %, and in a range of from 30 weight % to 80 weight % of the liquid medium as compared to the total weight of the phthalonitrile solution. The amount of the phthalonitrile prepolymer composition in the phthalonitrile solution may be no more than 10 weight % as compared to the total weight of the solution. This includes no more than 20 weight %, no more than 40 weight %, no more than 50 weight %, no more than 70 weight %, and in a range of from 15 weight % to 65 weight % of the phthalonitrile prepolymer composition as compared to the total weight of the phthalonitrile solution.

If desired, one or more additives may be added to the phthalonitrile solution. For example, fillers may be used. Fillers are generally non-reactive with respect to the components of the phthalonitrile solution and may be used to tune the properties of the phthalonitrile coating composition and the thermoset polymer formed therefrom. Thus, the types of fillers used and their amounts may be selected depending upon the desired use for the phthalonitrile coating composition and the thermoset polymer. Combinations of different types of fillers may be used.

Illustrative fillers include carbon-based fillers such as carbon black (e.g., Super P), graphite, carbon fiber, and the like. Other fillers include metallic fillers such as nickel, silver, copper, gold, platinum, iridium, iron, titanium, zinc, and the like. Metallic fillers also include alloys comprising such metals such as stainless steel, nichrome, and the like. Other fillers include metal oxide fillers such as silica, fumed silica, alumina, iron oxide, and the like. Other fillers include polymeric fillers such as those composed of a polyaryletherketone (e.g., polyetheretherketone (PEEK), polyetherketoneketone (PEKK)), a polyetherimide, and the like.

The morphology of the fillers is not particularly limited. The fillers may be particulate in form and have an aspect ratio of less than 2 (encompassing spherical shapes, elliptical shapes, and the like) or have an aspect ratio of greater than 2 (encompassing elongated shapes such as wires, rods, tubes, whiskers, fibers, needles, and the like). Similarly, the dimensions of the fillers are not particularly limited. The fillers may have a nanoscale dimension in which one, two, or all three dimensions are 1000 nm or less. The fillers may have a microscale dimension in which one, two, or all three dimensions are in a range of from 1 μm to 1 mm.

In embodiments, a filler is added to the phthalonitrile solution at an amount in a range of from 0.001 weight % to 20 weight %, including from 0.01 weight % to 15 weight %, and from 0.1 weight % to 15 weight % as compared to the total weight of the phthalonitrile solution. When multiple fillers are used, these weight percentages refer to the total weight of the multiple fillers.

Other additives which may be included in the phthalonitrile solution include dispersants, flow agents, cure promoters, surfactants, the like, and combinations thereof. Again, a variety of types of these components may be added to tune the properties of the phthalonitrile coating composition and the thermoset polymer formed therefrom. When present, they may be included in amounts described above with respect to the fillers. The phthalonitrile additives described above may also be used as additives in the phthalonitrile solution. However, as noted above, in embodiments, phthalonitrile additives are not used and the phthalonitrile solution (and the phthalonitrile coating composition) is free of any such additives.

In embodiments, if an additive is used, it is not a non-reactive plasticizer such as the acid esters, trimellitates, organophosphates, and polymer non-reactive plasticizers disclosed in U.S. Pat. Pub. No. 20170002146, which is hereby incorporated by reference for purpose of the non-reactive plasticizers. In such embodiments, neither the phthalonitrile solution, nor the resulting phthalonitrile coating composition contains such a non-reactive plasticizer.

The present methods further comprise mixing the phthalonitrile solution. The mixing may be carried out using a variety of techniques, e.g., centrifugal mixing, shaking, hand mixing, shear mixing, etc. The mixing is generally carried out at room temperature, i.e., without the application of heat, and in ambient atmosphere. The mixing may be carried out at a speed and for a time, both selected to facilitate dissolution of the bisphthalonitrile prepolymer and homogeneous distribution of any additives, if present. Illustrative speeds include those in a range of from 1000 rpm to 2300 rpm, from 1000 rpm to 2000 rpm, and from 1200 rpm to 1800 rpm. Illustrative times include those in a range of from 10 seconds to 30 minutes, from 1 minute to 30 minutes, from 1 minute to 15 minutes, and from 1 minute to 5 minutes. The mixing may be carried out in one step or multiple steps. The use of multiple steps involves a first mixing at an initial speed for an initial time, followed by at least a second mixing at another speed for another time. (See Example 1.2.)

Depending upon the desired form of the phthalonitrile coating composition, the present methods may or may not comprise additional steps to form the phthalonitrile coating composition. In embodiments such as for phthalonitrile sprays, the mixed phthalonitrile solution may be used as is and may be sprayed onto a desired substrate to form a phthalonitrile coating thereon using a variety of spraying techniques (e.g., spray gun).

In other embodiments, such as for phthalonitrile pastes, the mixed phthalonitrile solution may be stored for a period of time under conditions that minimize or prevent removal of the liquid medium (e.g., by covering and using at ambient temperature). This step facilitates the dissolution of the bisphthalonitrile prepolymer. The period of time may be at least 1 day, at least 2 days, at least 5 days, or in a range of from 1 day to 14 days.

Phthalonitrile composite films involve an additional step of applying the mixed phthalonitrile solution onto a fibrous material comprising a plurality of fibers, such as a scrim comprising glass fibers, carbon fibers, alumina fibers, ceramic fibers, or combinations thereof. The fibrous material may be woven or nonwoven. The mixed phthalonitrile solution infiltrates the fibrous material/scrim to fill void spaces between the plurality of fibers. After application of the mixed phthalonitrile solution onto the fibrous material, a portion of the liquid medium (or a component thereof) may be removed, e.g., via evaporation. The evaporation is generally carried out at room temperature, i.e., without the application of heat, and in ambient atmosphere (i.e., air). The result is a phthalonitrile composite film. The phthalonitrile composite film may also be referred to as a "prepreg." (See Examples, below.)

The phthalonitrile coating compositions, including the pastes, sprays, and composite films, are also encompassed by the present disclosure. They each comprise (or consist of) one or more types of a bisphthalonitrile prepolymer composition; a liquid medium; and optionally, one or more types of an additive. Any of the bisphthalonitrile prepolymer compositions, liquid media, and additives described herein may be used at the amounts described herein in any combination without limitation. Phthalonitrile composite films further comprise the fibrous material comprising the plurality of fibers into which the mixed phthalonitrile solution is infiltrated. Phthalonitrile pastes may be characterized by a shear viscosity of greater than 1,000 cps, greater than 10,000 cps, greater than 100,000 cps, or in a range of from 1,200 to 500,000 cps, all as measured at room temperature and 100 Hz. Phthalonitrile sprays may be characterized by a shear viscosity of less than 300 cps, less than 150 cps, less than 50 cps, or in a range from 0.5 to 250 cps, all as measured at room temperature and 100 Hz. In both cases, these shear viscosities may be measured using a Malvern viscometer with a parallel plate geometry (25 mm plate, 0.20 mm gap) and a shear rate range from 0.1 Hz to 1000 Hz.

The phthalonitrile coating compositions, including the pastes, sprays, and composite films may be used in a variety of environments, including the aerospace industry, the automobile industry, the submarine industry, the electronics industry, the construction industry, and the like. Thus the phrases "aerospace industry," "automobile industry," and "submarine industry" may refer to any device, craft, machine, or components thereof used in the industries such as aircraft, an airplane, a rotocraft, a boat, a submarine, a space ship, a trajectory device, a drone, a satellite, an automobile, a bus, a locomotive, a train car, and the like.

Phthalonitrile Sprays

In embodiments, a method of preparing a phthalonitrile spray comprises (a) heating a phthalonitrile precursor composition comprising a bisphthalonitrile compound to a temperature and for a period of time to form a phthalonitrile prepolymer composition comprising a bisphthalonitrile prepolymer; (b) cooling the phthalonitrile prepolymer composition to ambient temperature and pulverizing the phthalonitrile prepolymer composition to form particles; (c) combining the particles with a liquid medium to form a phthalonitrile solution; (d) optionally, adding an additive to the phthalonitrile solution; and (e) mixing the phthalonitrile solution to form a phthalonitrile coating composition, wherein the phthalonitrile coating composition is a phthalonitrile spray having a shear viscosity of less than 300 cps as measured at ambient temperature and 100 Hz. This includes the shear viscosity being less than 150 cps, less than 50 cps, or in a range from 0.5 to 250 cps, all as measured at room temperature and 100 Hz. Any of the phthalonitrile precursor compositions, bisphthalonitrile compounds, liquid media, additives, etc., as described herein may be used, in various amounts and combinations as described herein.

Phthalonitrile Pastes

In embodiments, a method of preparing a phthalonitrile spray comprises (a) heating a phthalonitrile precursor composition comprising a bisphthalonitrile compound to a temperature and for a period of time to form a phthalonitrile prepolymer composition comprising a bisphthalonitrile prepolymer; (b) cooling the phthalonitrile prepolymer composition to ambient temperature and pulverizing the phthalonitrile prepolymer composition to form particles; (c) combining the particles with a liquid medium to form a phthalonitrile solution; (d) optionally, adding an additive to the phthalonitrile solution; (e) mixing the phthalonitrile solution; and (f) storing the mixed phthalonitrile solution for a second period of time at ambient temperature to form a phthalonitrile coating composition, wherein the phthalonitrile coating composition is a phthalonitrile paste having a shear viscosity of greater than 1,000 cps as measured at ambient temperature and 100 Hz. This includes the shear viscosity being greater than 10,000 cps, greater than 100,000 cps, or in a range of from 1,200 to 500,000 cps, all as measured at room temperature and 100 Hz. Any of the phthalonitrile precursor compositions, bisphthalonitrile compounds, liquid media, additives, etc., as described herein may be used, in various amounts and combinations as described herein.

Phthalonitrile Composite Films

In embodiments, a method of preparing a phthalonitrile composite film comprises (a) heating a phthalonitrile precursor composition comprising a bisphthalonitrile compound to a temperature and for a period of time to form a phthalonitrile prepolymer composition comprising a bisphthalonitrile prepolymer; (b) cooling the phthalonitrile prepolymer composition to ambient temperature and pulverizing the phthalonitrile prepolymer composition to form particles; (c) combining the particles with a liquid medium to form a phthalonitrile solution; (d) optionally, adding an additive to the phthalonitrile solution; (e) mixing the phthalonitrile solution; (f) applying the mixed phthalonitrile solution to a fibrous material comprising a plurality of fibers to infiltrate the mixed phthalonitrile solution into void spaces between fibers of the plurality of fibers; and (g) removing a portion of the liquid medium to form a phthalonitrile coating composition as a phthalonitrile composite film. Any of the phthalonitrile precursor compositions, bisphthalonitrile compounds, liquid media, additives, fibrous material, etc., as described herein may be used, in various amounts and combinations as described herein.

Figure 2:
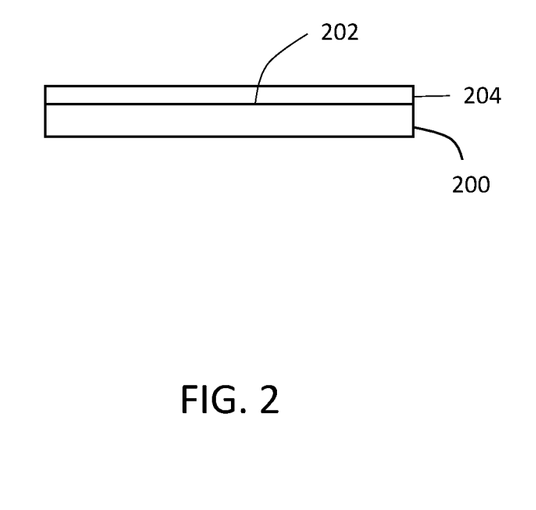
FIG. 2 shows a schematic of a substrate coated with a phthalonitrile coating composition according to an illustrative embodiment.

As shown in FIG. 2, any of the disclosed phthalonitrile coating compositions may be applied onto a surface 202 of substrate 200 to form a coating 204 thereon. The phthalonitrile coating compositions are particularly useful for application onto vertical surfaces, overhead surfaces, and substrates having complex geometries and hard to reach areas. The substrate 200 may be a component used in any of the industries listed above and composed of any type of material, e.g., metal, glass, and the like. The application technique depends upon the form of the phthalonitrile coating composition. For example, phthalonitrile pastes may be applied by spreading, painting, brushing, wiping, etc., while phthalonitrile sprays are sprayed as described above. Phthalonitrile composite films may be applied by pressing, molding, etc. The resulting coating may have any desired thickness, e.g., in a range of from 0.1 mm to 100 mm. The thickness also depends upon the form of the phthalonitrile coating composition used. In any of the embodiments, a second substrate may be placed on the coating 204. The coating 204 functions to adhere the two substrates together.

In whichever environment and for whichever application they are to be used, the phthalonitrile coating compositions (or coatings formed therefrom) are generally cured to form a thermoset polymer therefrom. Such curing involves heating for a period of time, generally, in an inert environment. The temperatures and/or times are greater than those used to achieve the partial curing described above so as to increase (e.g., maximize) the degree of crosslinking between phthalonitrile moieties. The curing may be carried out according to a curing profile involving holds at certain temperatures for certain periods of times. The curing profile may also involve use of certain heating rates to achieve the different temperatures. Various curing profiles may be used, depending upon the selected phthalonitrile coating composition and the desired properties for the thermoset polymer. An illustrative curing profile is provided in the Example, below. Another illustrative curing profile is 200° C. (30 minutes), 250° C. (90 minutes), 300° C. (180 minutes), 350° C. (90 minutes), 375° C. (60 minutes). The present methods may further comprise curing to convert the phthalonitrile coating composition (or coating formed therefrom) to a thermoset polymer. The thermoset polymer may be characterized by a glass transition temperature $T_g$, including in a range of from 200° C. to 500° C., including from 250° C. to 450° C., and from 300° C. to 400° C. The $T_g$ may be measured using a differential scanning calorimeter. The thermoset polymer may be characterized by a degradation temperature of greater than 450° C., greater than 500° C., or greater than 550° C. The degradation temperature may be measured using a thermogravimetric analyzer (e.g., TGA Q500).

The coated substrates and thermoset polymers formed using the methods described above are also encompassed by the present disclosure.

EXAMPLES

Materials

Bisphenol A oligomeric phthalonitrile composition (Bis A PEEK PN), Bisphenol AF oligomeric phthalonitrile composition (Bis AF PEEK PN), and Resorcinol n=3 oligomeric phthalonitrile composition (Resorcinol PEEK PN) were purchased from the Naval Research Laboratory and used as received. Each of these compositions contains 3% (by weight) of Bis [4-(3-aminophenoxy) phenyl] Sulfone curing agent. 4-Methyl-2-pentanone (MIBK) and 2-butanone (MEK) were purchased from Sigma Aldrich and dried prior to use. 2-Phenoxyethanol was purchased from Sigma Aldrich and used as received. Ketaspire KT-820 UFP was purchased from Solvay Specialty Polymers and used as received. Aerosil® R 972 fumed silica was provided by Evonik Resource Efficiency GmbH and was used as received.

Example 1: B-Staging Bis A PEEK PN

A 6" diameter crystallization dish was lined with aluminum foil. To this dish, 50 g of the Bis A PEEK PN was poured into the crystallizing dish and spread evenly. The dish was placed in a 200° C. furnace in air and allowed to heat for 90 minutes. The crystallizing dish was then removed from the oven and allowed to quench cool at room temperature until it became a frangible solid (usually within 1 minute). The solid was then peeled off the aluminum foil and ground up using a mortar and pestle until it became a rough powder (Bis A PEEK prepolymer).

Example 1.1: Paste Formulation—Bis A PEEK PN 4.0 g of MIBK was added to a mixing cup along with two 0.2" diameter glass beads followed by 0.5 g Ketaspire KT-820 UFP, 0.01 g R972 fumed silica, and 5.5 g of the B-staged Bis A PEEK prepolymer powder (Example 1). This solution was mixed in a centrifugal mixer at 1500 rpm for 4 minutes. The cup was then sealed using parafilm and allowed to sit for two days to allow for dissolution of the bisphthalonitrile prepolymer while minimizing/preventing loss of MIBK. The resulting solution was a viscous paste that can be buttered onto substrates using a spatula or similar tool.

Example 1.2: Prepreg Formulation—Bis A PEEK PN

A 1 mil thick glass scrim was taped over a silanized release film on a glass plate. 72.0 g MIBK, 36.0 g 2-phenoxyethanol, 18.0 g Ketaspire KT-820 UFP, 0.4 g Aerosil R972, and 180.0 g Bis A PEEK prepolymer powder (Example 1) was added to a mixing cup. This solution was mixed in a centrifugal mixer according to the following schedule: 30 seconds at 1000 rpm, 30 seconds at 1300 rpm, 30 seconds at 1500 rpm, 30 minute wait, 30 seconds at 1500 rpm, and 3 minutes at 1500 rpm. The resulting solution was then filtered using a 200 mesh screen. This filtered solution was poured onto the glass scrim and a wooden stick was used to distribute the solution evenly. This solution was allowed to air dry in a hood. Once the top surface was dry, the sample was gently peeled up from the release film and turned over. The backside of the prepreg was allowed to air dry in the hood until it was tack-free.

Example 1.3: Spray Formulation—Bis A PEEK PN 5.0 g of Bis A PEEK prepolymer (Example 1), 1.5 g Ketaspire KT-820 UFP, 7.5 g MEK, 7.5 g MIBK, and four 0.2" diameter glass beads were added to a mixing cup and mixed in a centrifugal mixer at 1500 rpm for 3 minutes. The resulting solution was poured into a spray cup containing a 200 mesh screen for filtration. The solution was then sprayed via a high-volume low pressure (HVLP) spray gun onto a metallic substrate. Passes were quick and at least 30 seconds was given between coats to allow for solvent flashing.

Example 2: B-Staging Bis AF PEEK PN

A 5.5" diameter crystallization dish was lined with aluminum foil. To this dish, 25 g of the Bis AF PEEK PN was poured into the crystallizing dish and spread evenly. The dish was placed in a 200° C. furnace in air and allowed to heat for 20 minutes. The crystallizing dish was then removed from the oven and allowed to quench cool at room temperature until it became a frangible solid (usually within 1 minute). The solid was then peeled off the aluminum foil and ground up using a mortar and pestle until it became a rough powder (Bis AF PEEK prepolymer).

Example 2.1: Paste Formulation—Bis AF PEEK PN 3.0 g Bis AF PEEK prepolymer, 0.3 g Ketaspire KT-820 UFP, 1.5 g MIBK, and three 0.2" diameter glass beads were added to a mixing cup. This solution was mixed in a centrifugal mixer at 1500 rpm for 4 minutes. The cup was then sealed using parafilm and allowed to sit for eleven days to allow for dissolution of the bisphthalonitrile prepolymer while minimizing/preventing loss of MIBK. The resulting solution was a viscous paste that can be buttered onto substrates using a spatula or similar tool.

Example 2.2: Spray Formulation—Bis AF PEEK PN 3 g of Bis AF PEEK prepolymer, 9 g MIBK, and three 0.2" diameter glass beads were added to a mixing cup and mixed in a centrifugal mixer at 1500 rpm for 3 minutes. The resulting solution was poured into a spray cup containing a 200 mesh screen for filtration. The solution was then sprayed via a HVLP spray gun onto a metallic substrate. The coated substrate was allowed to air dry in a fume hood overnight.

Example 3: B-Staging—Resorcinol PEEK PN

A 5.5" diameter crystallization dish was lined with aluminum foil. To this dish, 25 g of the Resorcinol PEEK PN was poured into the crystallizing dish and spread evenly. The dish was placed in a 190° C. furnace in air and allowed to heat for 20 minutes. The crystallizing dish was then removed from the oven and allowed to quench cool at room temperature until it became a frangible solid (usually within 1 minute). The solid was then peeled off the aluminum foil and ground up using a mortar and pestle until it became a rough powder (Resorcinol PEEK prepolymer).

Example 3.1: Paste Formulation—Resorcinol PEEK PN 1.5 g of MIBK was added to a mixing cup along with two 0.2" diameter glass beads followed by 0.3 g Ketaspire KT-820 UFP, 0.01 g R972 fumed silica, and 3 g of the B-staged Resorcinol PEEK prepolymer powder (Example 3). This solution was mixed in a centrifugal mixer at 1500 rpm for two minutes followed by 2300 rpm for two minutes. The cup was then sealed using parafilm and allowed to sit for two days to allow for dissolution of the bisphthalonitrile prepolymer while minimizing/preventing loss of MIBK. The resulting solution was a viscous paste that can be buttered onto substrates using a spatula or similar tool.

Example 3.2: Spray Formulation—Resorcinol PEEK PN 3 g of Resorcinol PEEK prepolymer, 9 g MIBK, and three 0.2" diameter glass beads were added to a mixing cup and mixed in a centrifugal mixer at 1500 rpm for 3 minutes. The resulting solution was poured into a for filtration. The solution was then sprayed via a HVLP spray gun onto a metallic substrate. The coated substrate was allowed to air dry in a fume hood overnight.

Example 4: Post Curing

Samples were cured under nitrogen in a box furnace using the following cure schedule: 200° C. (90 minutes), 250° C. (6 hours), 300° C. (3 hours), 350° C. (3 hours), 375° C. (6 hours).

Characterization

Pastes: Paste formulations allowed for room temperature application onto a variety of substrates while maintaining good tack. As they were too viscous to be applied with a brush, they were buttered on a variety of substrates using a spatula or similar tool. However, the high viscosity allowed for application onto vertical substrates without experiencing significant sagging prior to post cure. Moreover, the final viscosity of the pastes is adjustable by changing the total amount of solvent added. Sealed pastes maintained their viscosities in excess of 21 days. However, dried pastes were rejuvenated with additional solvent and a quick mix. Post curing of pastes produced void free thermosets.

Prepreg: Prepreg formulations allowed for room temperature application onto a variety of substrates. The prepreg formulations were stored at room temperature in open air for up to 14 days without experiencing any cracking or breaking. When stored in a sealed container, however, the mechanical flexibility of the prepreg formulations were maintained in excess of 14 days. Prepreg formulations are amenable to cutting into various shapes and molding into complex geometries at room temperature due to their high flexibility. Post curing of prepreg formulations produced void free thermosets.

Spray: Spray formulations allowed for room temperature application onto a variety of substrates. The spraying deposits a thin film layer onto the desired substrate, including vertical substrates without sagging. Thicknesses up to 5 mils were readily achieved. Sprayed substrates were maintained at room temperature in excess of seven days between spraying and post curing without issue. Post curing of spray formulations produced a void free thermoset.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method of preparing a phthalonitrile coating composition, the method comprising:
    (a) heating a phthalonitrile precursor composition comprising a bisphthalonitrile compound to a temperature and for a period of time to form a phthalonitrile prepolymer composition comprising a bisphthalonitrile prepolymer;
    (b) cooling the phthalonitrile prepolymer composition to ambient temperature and pulverizing the phthalonitrile prepolymer composition to form particles;
    (c) combining the particles with a liquid medium to form a phthalonitrile solution;
    (d) optionally, adding an additive to the phthalonitrile solution; and
    (e) mixing the phthalonitrile solution to form a phthalonitrile coating composition,
    further comprising after mixing the phthalonitrile solution, storing the mixed phthalonitrile solution for a second period of time at ambient temperature to form the phthalonitrile coating composition as a phthalonitrile paste.

2. The method of claim 1, wherein the bisphthalonitrile compound comprises an aromatic ether linking group and an aromatic ketone linking group.

3. The method of claim 2, wherein the aromatic ether linking group is provided by a bisphenol and the aromatic ketone linking group is provided by a benzophenone.

4. The method of claim 1, wherein the phthalonitrile precursor composition further comprises a curing agent, a phthalonitrile additive, or both.

5. The method of claim 1, wherein the phthalonitrile precursor composition and the phthalonitrile coating composition is free of a phthalonitrile additive.

6. The method of claim 1, wherein the temperature is not more than 250° C. and the period of time is not more than 120 minutes in step (a).

7. The method of claim 1, wherein the bisphthalonitrile prepolymer has a solubility in the liquid medium in a range of from 0.1 g/mL to 5 g/mL at ambient temperature and atmospheric pressure.

8. The method of claim 1, wherein the liquid medium comprises a solvent having a boiling point of greater than 150° C.

9. The method of claim 1, wherein the liquid medium comprises two solvents, each having different boiling points.

10. The method of claim 1, wherein the phthalonitrile solution comprises at least 30 weight % of the liquid medium and not more than 70 weight % of the phthalonitrile prepolymer composition.

11. The method of claim 1, comprising step (d).

12. The method of claim 11, wherein the additive is selected from a group consisting of a filler, a dispersant, a flow agent, a cure promoter, and a surfactant and the phthalonitrile solution comprises from 0.001 weight % to 20 weight % of the additive.

13. The method of claim 12, wherein the additive is not a phthalonitrile additive and is not a non-reactive plasticizer and the phthalonitrile coating composition is free of the phthalonitrile additive and the non-reactive plasticizer.

14. The method of claim 1, wherein the mixing is carried out at ambient temperature and ambient atmosphere.

15. The method of claim 1, wherein the mixing is carried out at a speed in a range of from 1000 rpm to 2300 rpm and for a time in a range of from 10 seconds to 30 minutes.

16. The method of claim 1, wherein the period of time is in a range of from 1 day to 14 days.

17. The method of claim 1, wherein the phthalonitrile paste has a shear viscosity of greater than 1,000 cps as measured at ambient temperature and 100 Hz.

18. The method of claim 1, further comprising applying the phthalonitrile coating composition to a surface of a substrate to form a coating thereon.

19. The method of claim 18, wherein the substrate is an aerospace component.

20. The method of claim 18, further comprising heating the coating according to a curing profile to form a thermoset polymer.

21. The method of claim 20, wherein the thermoset polymer is characterized by a glass transition temperature $T_g$ in a range of from 200° C. to 500° ° C., a degradation temperature of greater than 450° C., or both.

22. A method of preparing a phthalonitrile coating composition, the method comprising:
    (a) heating a phthalonitrile precursor composition comprising a bisphthalonitrile compound to a temperature and for a period of time to form a phthalonitrile prepolymer composition comprising a bisphthalonitrile prepolymer;
    (b) cooling the phthalonitrile prepolymer composition to ambient temperature and pulverizing the phthalonitrile prepolymer composition to form particles;
    (c) combining the particles with a liquid medium to form a phthalonitrile solution;
    (d) optionally, adding an additive to the phthalonitrile solution; and
    (e) mixing the phthalonitrile solution to form a phthalonitrile coating composition, wherein the phthalonitrile coating composition does not comprise a curing agent.

* * * * *